US012399787B1

(12) United States Patent
Yadav et al.

(10) Patent No.: US 12,399,787 B1
(45) Date of Patent: Aug. 26, 2025

(54) DETECTING THE MOST RECENT STATE OF AN ACTIVE DIRECTORY OBJECT AND RECOVERING USING BACKUPS OR PRODUCTION TOMBSTONES

(71) Applicant: Dell Products L.P., Round Rock, TX (US)

(72) Inventors: Sunil Yadav, Bengaluru (IN); Amarendra Behera, Bengaluru (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/771,222

(22) Filed: Jul. 12, 2024

(51) Int. Cl.
  *G06F 11/14* (2006.01)
  *G06F 9/455* (2018.01)
(52) U.S. Cl.
  CPC .......... *G06F 11/1464* (2013.01); *G06F 9/455* (2013.01); *G06F 11/1469* (2013.01)
(58) Field of Classification Search
  CPC .. G06F 11/1464; G06F 9/455; G06F 11/1458; G06F 11/1469
  USPC ................................................. 711/162, 161
  See application file for complete search history.

(56) References Cited

U.S. PATENT DOCUMENTS

| | | | |
|---|---|---|---|
| 6,185,574 B1 | 2/2001 | Howard et al. |
| 7,694,103 B1 | 4/2010 | Kushwah |
| 8,037,032 B2 | 10/2011 | Pershin et al. |
| 9,171,002 B1 | 10/2015 | Mam et al. |
| 9,348,827 B1 | 5/2016 | Patwardhan et al. |
| 9,424,137 B1 | 8/2016 | Mam |
| 9,569,446 B1 | 2/2017 | Feathergill et al. |
| 9,684,739 B1 | 6/2017 | Ogata |
| 10,114,705 B1 | 10/2018 | Kumar |

(Continued)

FOREIGN PATENT DOCUMENTS

| | | |
|---|---|---|
| WO | 2011002777 A2 | 1/2011 |
| WO | 2015110171 A1 | 7/2015 |

(Continued)

OTHER PUBLICATIONS

Lipika Deka et al., Consistent Online Backup in Transactional File Systems, Consistent Online Backup in Transactional File Systems, vol. 26, Issue: 11, pp. 2676-2688, Nov. 2014.

*Primary Examiner* — Hosain T Alam
*Assistant Examiner* — Zubair Ahmed
(74) *Attorney, Agent, or Firm* — Chamberlain, Hrdlicka, White, Williams & Aughtry; Aly Z. Dossa

(57) ABSTRACT

A method for managing data protection includes initiating, by a backup server, identifying an active directory (AD) application on the VM, wherein the AD application comprises a set of AD objects and a directory service for managing the set of AD objects, in response to identifying the AD application, installing a new AD listener in the production environment, performing listening on the AD application in the production environment to detect changes to the set of AD objects, monitoring, by the backup server, generating a VM backup of the VM and an AD application backup of the AD application, and storing the VM backup and the AD application backup in a backup storage system, based on the VM backup generation, and based on the listening, performing a backup schedule analysis on the backup schedule, and based on the backup schedule analysis, performing a backup schedule modification on the backup schedule.

20 Claims, 11 Drawing Sheets

(56) References Cited

U.S. PATENT DOCUMENTS

| | | |
|---|---|---|
| 10,146,629 B1 | 12/2018 | Yadav et al. |
| 10,241,870 B1 | 3/2019 | Beatty |
| 10,310,949 B1 | 6/2019 | Chakraborty |
| 10,372,547 B1 | 8/2019 | Zhu et al. |
| 10,642,790 B1 | 5/2020 | Brenner |
| 11,340,824 B1 | 5/2022 | Yadav et al. |
| 11,513,921 B1 | 11/2022 | Yadav et al. |
| 2004/0028042 A1 | 2/2004 | Srinivasan et al. |
| 2005/0078196 A1 | 4/2005 | Okamoto |
| 2005/0166082 A1 | 7/2005 | Williams et al. |
| 2005/0246398 A1 | 11/2005 | Barzilai et al. |
| 2008/0124050 A1 | 5/2008 | Deschamp et al. |
| 2009/0276591 A1 | 11/2009 | Mu et al. |
| 2014/0180915 A1 | 6/2014 | Montulli |
| 2014/0188808 A1 | 7/2014 | Wolf |
| 2016/0127307 A1 | 5/2016 | Jain et al. |
| 2016/0188582 A1 | 6/2016 | Sprague et al. |
| 2017/0090770 A1 | 3/2017 | Minamiura et al. |
| 2018/0295400 A1 | 10/2018 | Thomas et al. |
| 2018/0322017 A1 | 11/2018 | Maccanti et al. |
| 2019/0324661 A1 | 10/2019 | Kottomtharayil et al. |
| 2020/0245034 A1 | 7/2020 | Dunker et al. |
| 2020/0387433 A1* | 12/2020 | Wang .................. G06F 16/2365 |
| 2021/0240569 A1 | 8/2021 | Chopra et al. |
| 2021/0326220 A1 | 10/2021 | Srinivasan et al. |
| 2021/0406129 A1 | 12/2021 | Zheng et al. |
| 2022/0382641 A1 | 12/2022 | Chopra et al. |
| 2022/0398161 A1 | 12/2022 | Yadav et al. |

FOREIGN PATENT DOCUMENTS

| | | |
|---|---|---|
| WO | 2015142676 A1 | 9/2015 |
| WO | 2018081737 A1 | 5/2018 |

\* cited by examiner

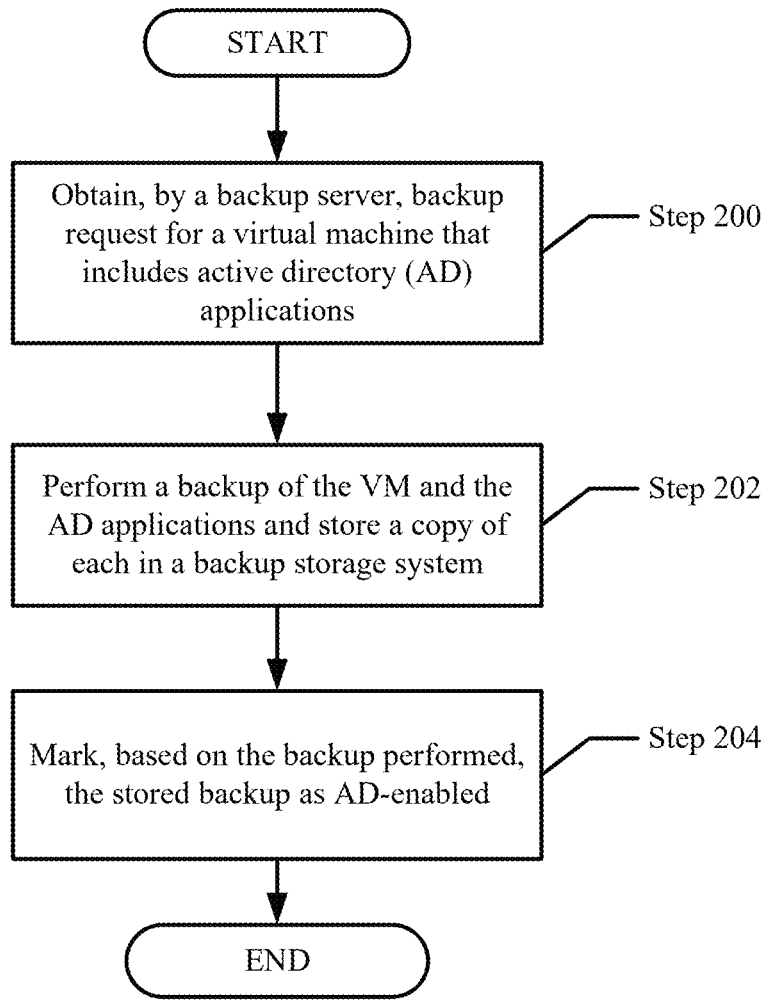
FIG. 2.1

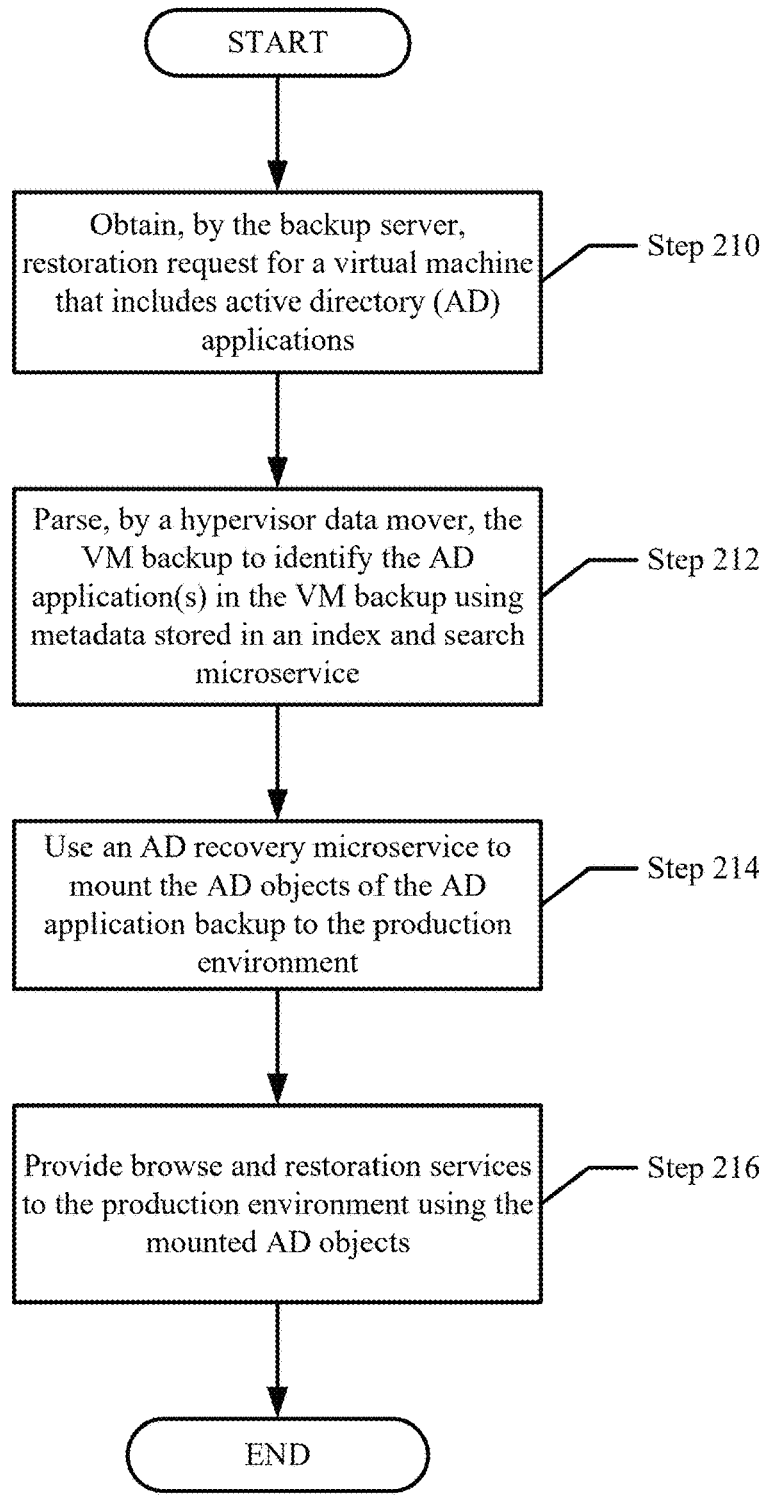
FIG. 2.2

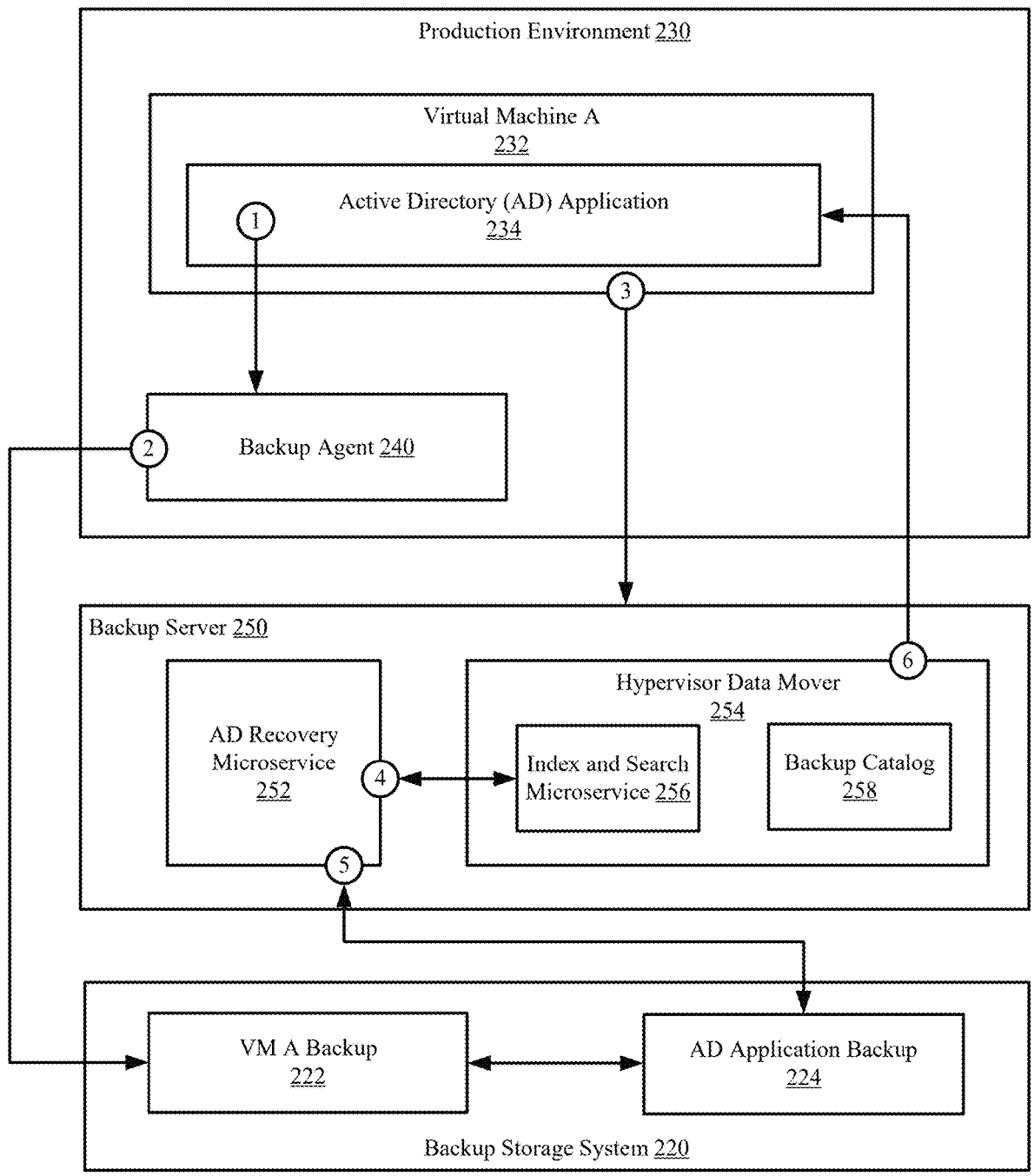
FIG. 2.3

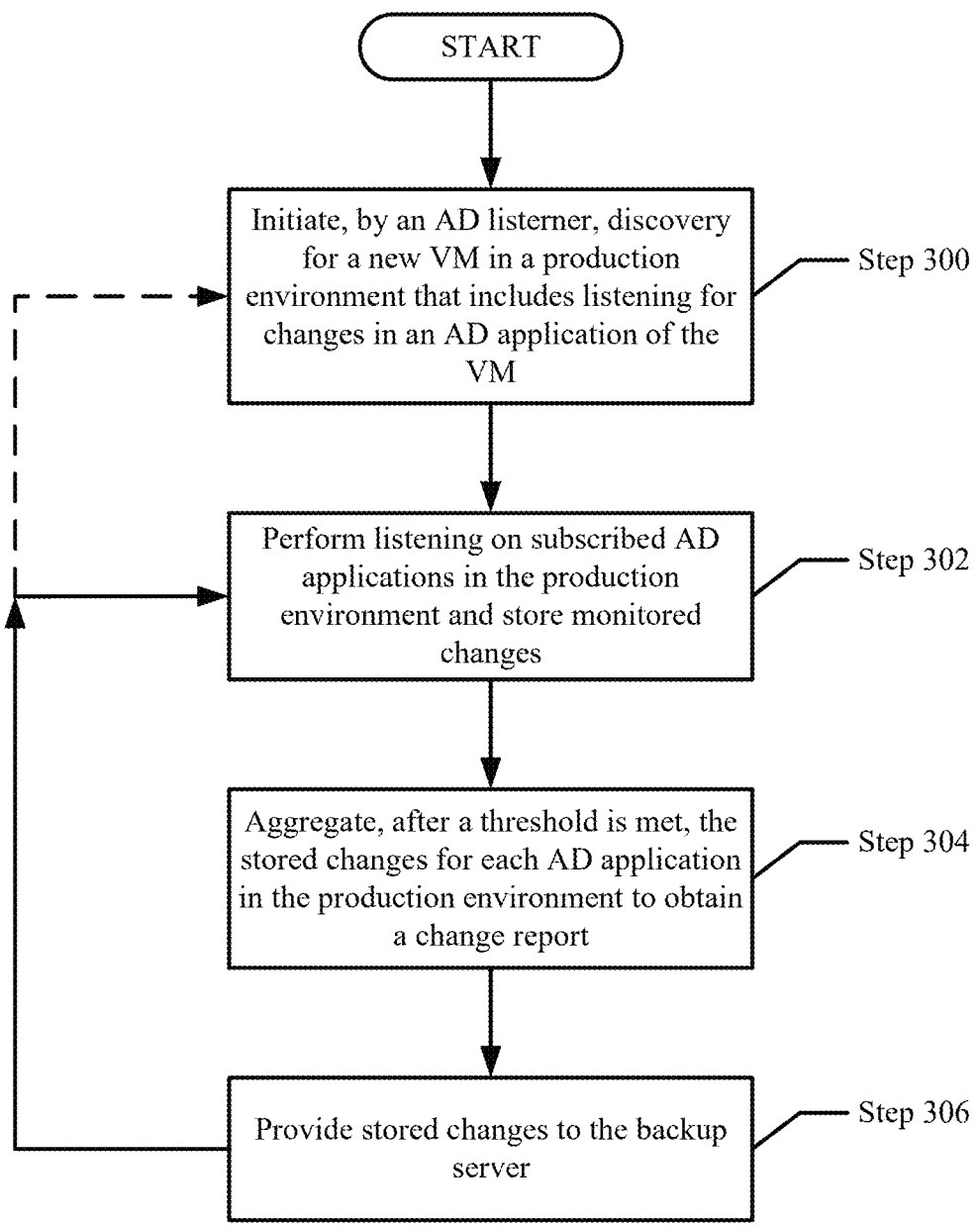
FIG. 3.1

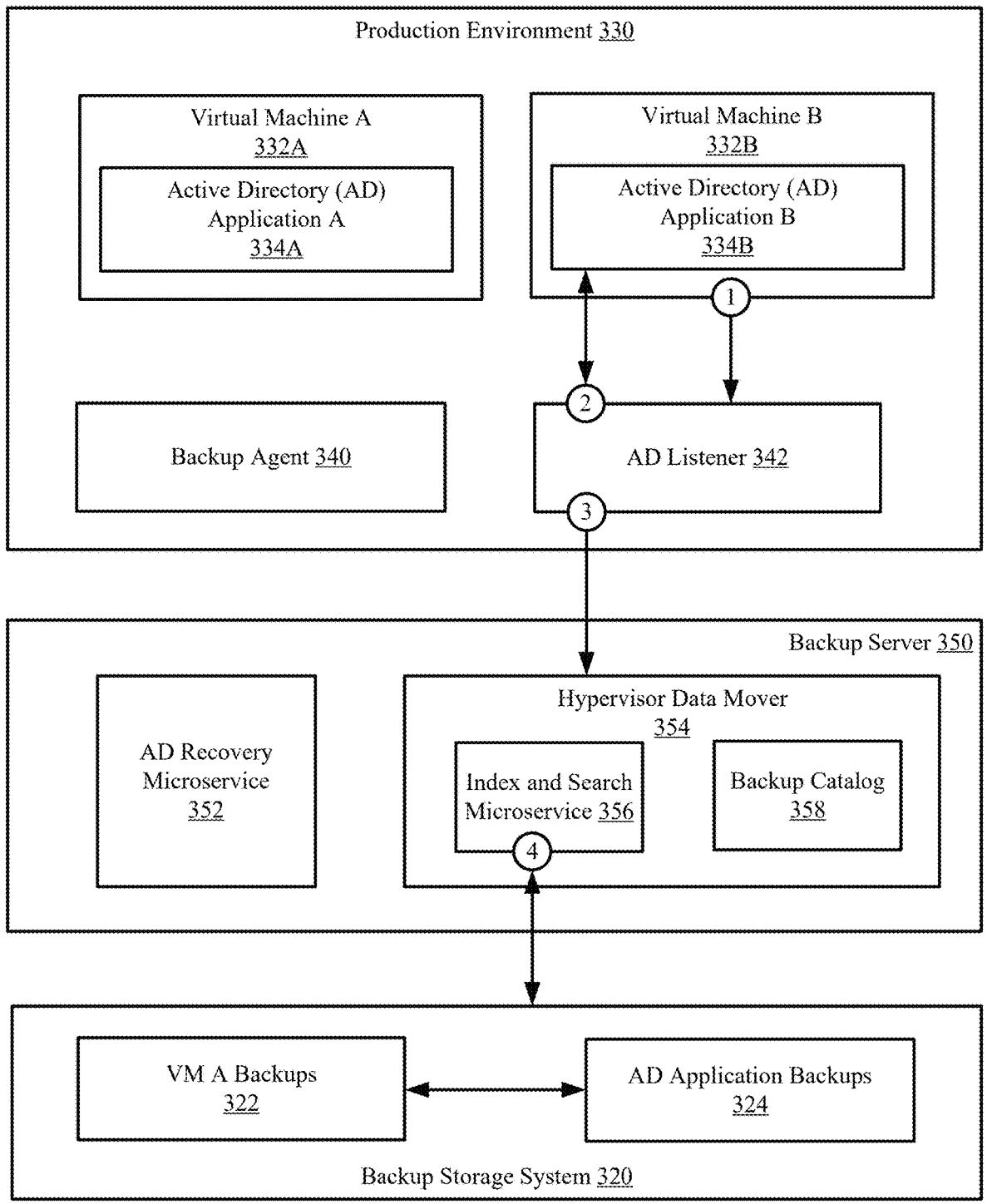
FIG. 3.2

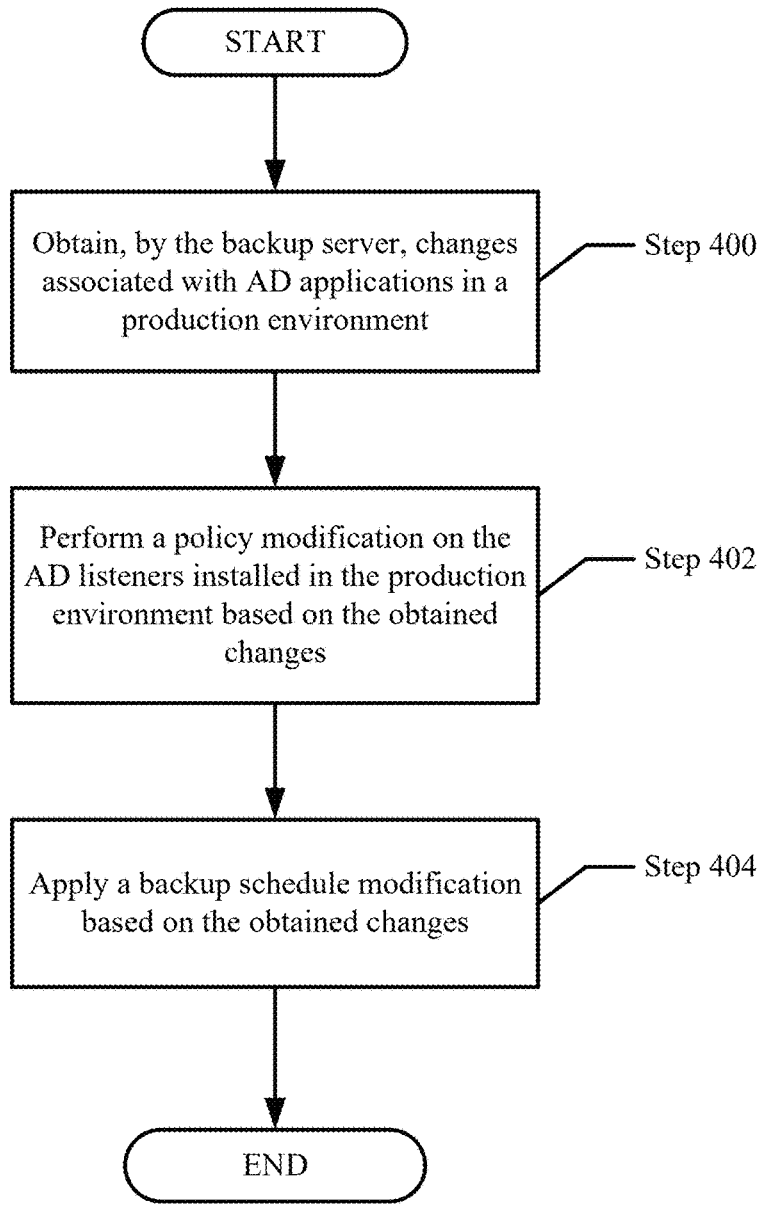
FIG. 4.1

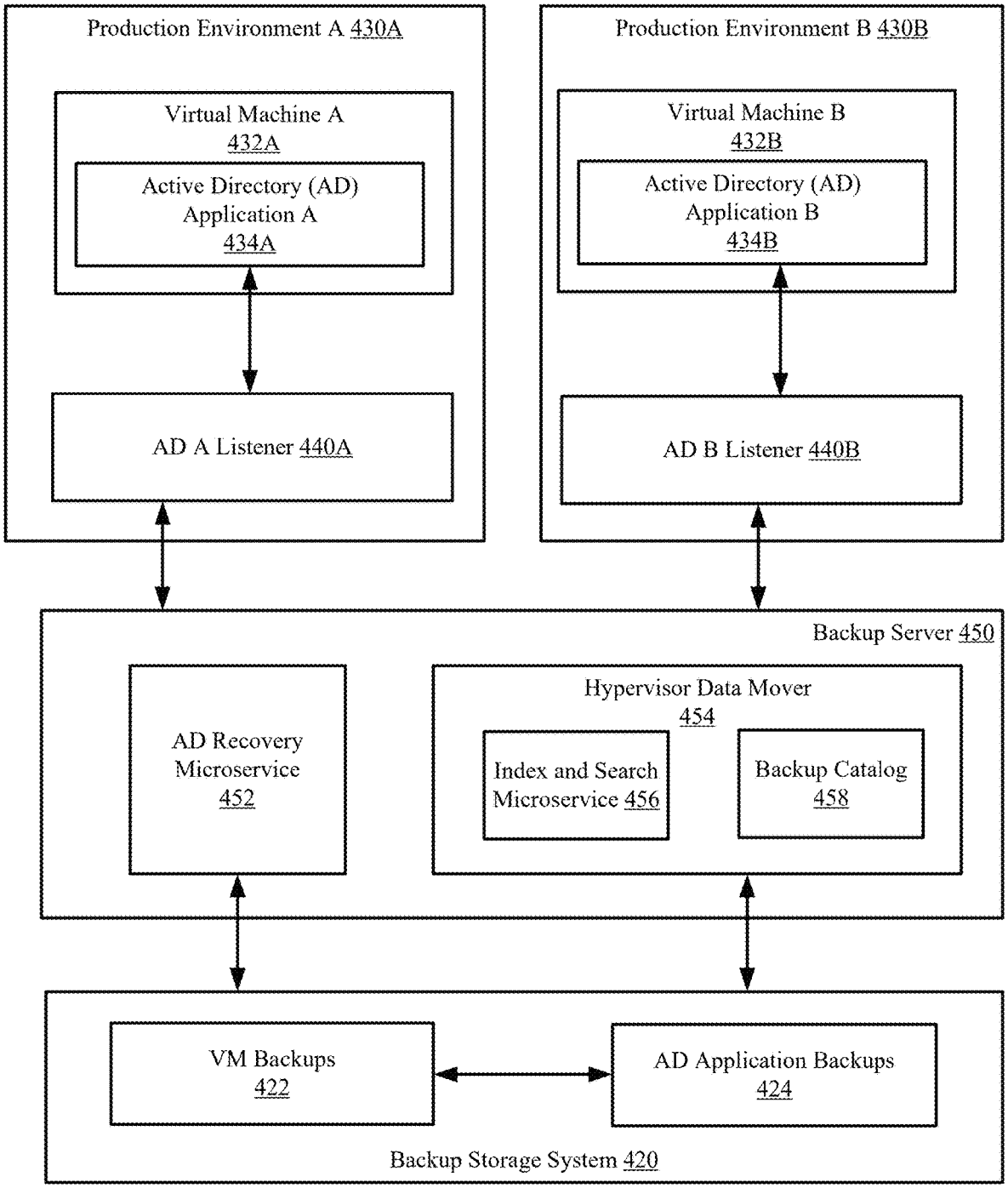
FIG. 4.2

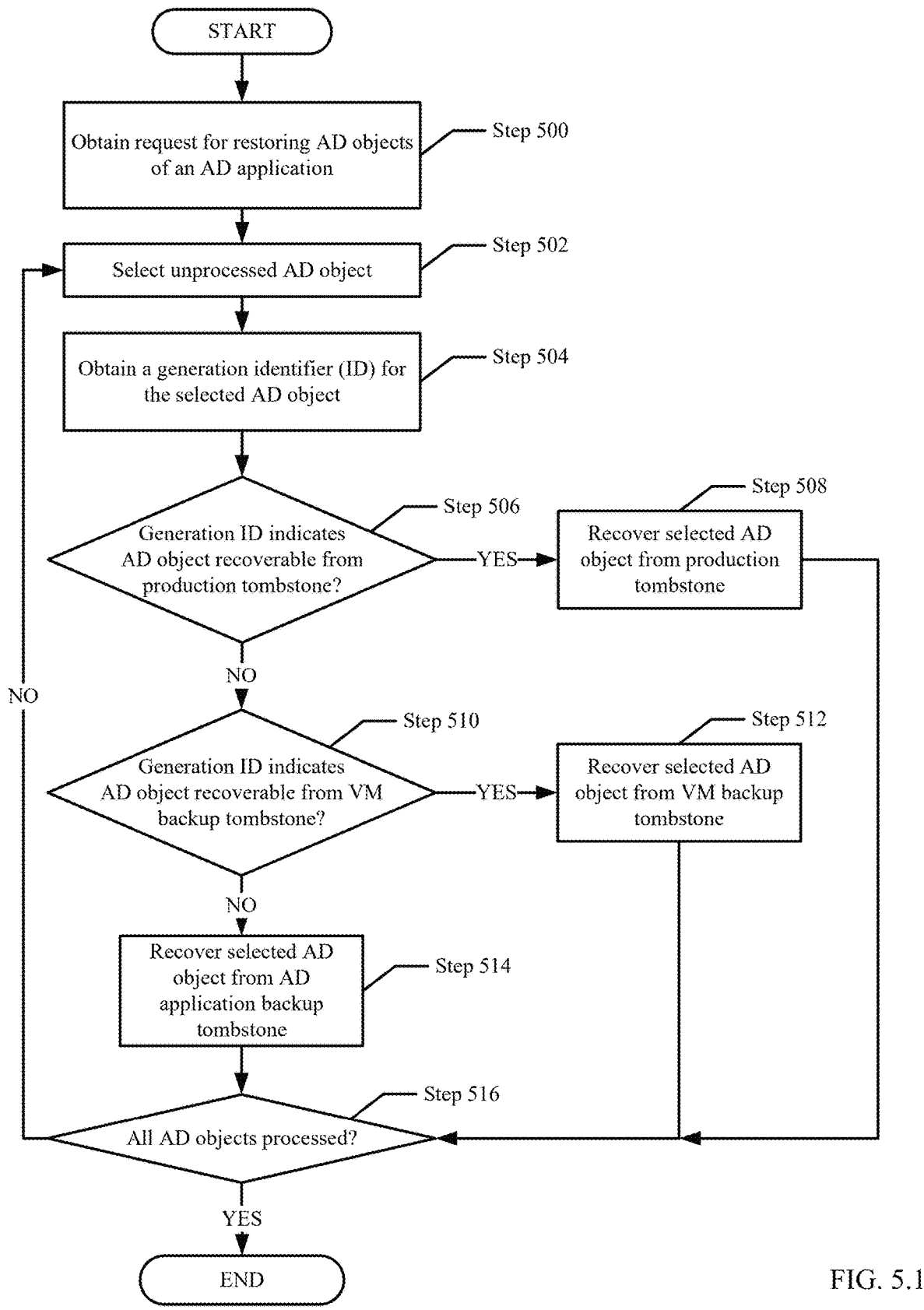
FIG. 5.1

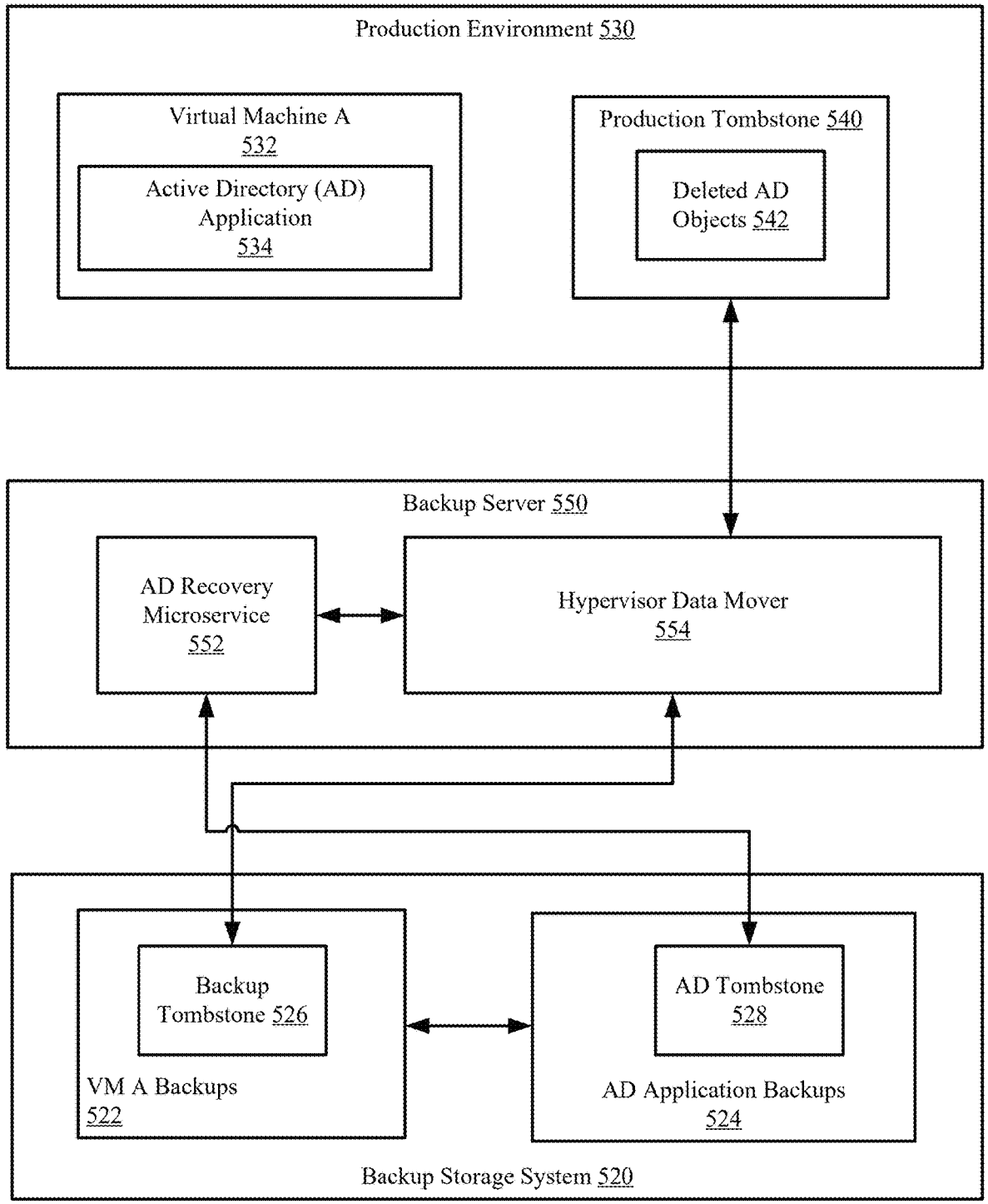
FIG. 5.2

… (1)

DETECTING THE MOST RECENT STATE OF AN ACTIVE DIRECTORY OBJECT AND RECOVERING USING BACKUPS OR PRODUCTION TOMBSTONES

BACKGROUND

In a data protection environment in which production environments host virtual machines whose data is protected using a backup storage system, users of the virtual machines may request granular level recovery of application objects from the backup storage system, in contrast to full backups of the virtual machines. The backups of the application objects may be generated with backups of the virtual machines.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method of backing up an AD-enabled virtual machine in accordance with one or more embodiments of the invention.

FIG. 2.2 shows a flowchart of a method of restoring AD objects from an AD-enabled virtual machine in accordance with one or more embodiments of the invention.

FIG. 2.3 shows a first example in accordance with one or more embodiments of the invention.

FIG. 3.1 shows a flowchart of a method of tracking changes to AD objects in an AD-enabled virtual machine in accordance with one or more embodiments of the invention.

FIG. 3.2 shows a second example in accordance with one or more embodiments of the invention.

FIG. 4.1 shows a flowchart of a method of modifying backup schedules and AD listeners in accordance with one or more embodiments of the invention.

FIG. 4.2 shows a third example in accordance with one or more embodiments of the invention.

FIG. 5.1 shows a flowchart of a method of recovering AD objects in accordance with one or more embodiments of the invention.

FIG. 5.2 shows a second example in accordance with one or more embodiments of the invention.

DETAILED DESCRIPTION

Figure 1:
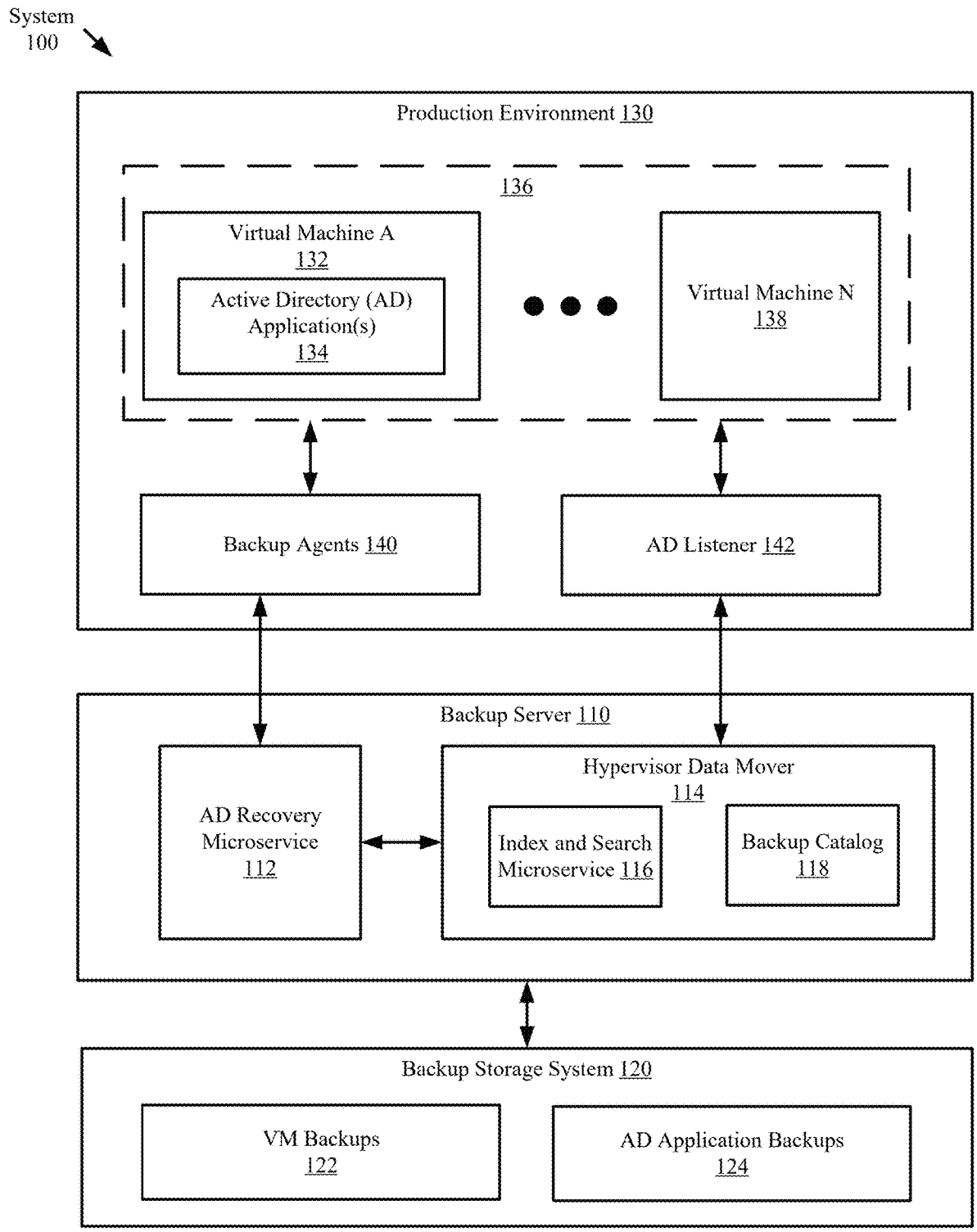
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Embodiments disclosed herein include systems and methods for managing data protection services for a production environment that hosts virtual machines enabled with active directory (AD) applications. The AD applications each include any number of AD objects and a directory service that manage the access, storage, and/or other modification of the AD objects. Without the use of agents in the production environment, embodiments include herein include enhancing a backup server to provide the data protection services such as backups and recoveries of the virtual machines. Further, the backup server in accordance with one or more embodiments of the invention includes functionality for granular recovery of the AD objects from the generation of VM backups by generating AD application backups, parsing the VM backups to determine the AD application backups, and mounting the AD objects from the AD application backups to the production environment.

In one or more embodiments, the backup server includes functionality for installing AD listeners on the production environment for monitoring changes on the AD applications. The changes are tracked using, for example, resilient change block tracking (RCT). The changes may be provided to the backup server, and used for backup generation.

In one or more embodiments, the changes tracked by the AD listener are further used for backup schedule modification such as increasing or decreasing a rate of backing up the corresponding VM. The backup schedule modification may further include increasing or decreasing the number of installed AD listeners in the production environment.

Embodiments of the invention further include managing recovery of AD objects from either production tombstones (i.e., the more accessible location) or, if not available in the production tombstones, recovery from the VM backups or the AD application backups.

The following describes various embodiments of the invention.

FIG. 1 shows a system in accordance with one or more embodiments of the invention. The system (100) includes a production environment (130) executing any number of virtual machines (132, 138), a backup server (110), and a backup storage system (120). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the production environment (130) provides computing resources to one or more virtual machines (VMs) (132, 138). The VMs (136) provide services to users by data. The VMs (136) may include a guest operating system (not shown), and provide any applications such as, for example, instances of databases, email servers, gaming software, word processors, and/or any other applications without departing from the invention. The VMs (136) may be backed up as VM backups (122) in the backup storage system (122).

In one or more embodiments, one or more of the VMs (136) host active directory (AD) applications (134). In one or more embodiments, the AD applications (134) of the production environment (130) may generate, store, and/or otherwise process data. The data processed by the AD applications (134) (referred to as AD objects) may be backed up to a backup storage system (120) as AD application backups (124) each corresponding to an AD application (134) at a given point in time. The production environment (130) may provide backup agents (140) that copy the virtual machine data and AD objects to the backup storage system (120) to be stored as backups (122, 124).

Figure 6:
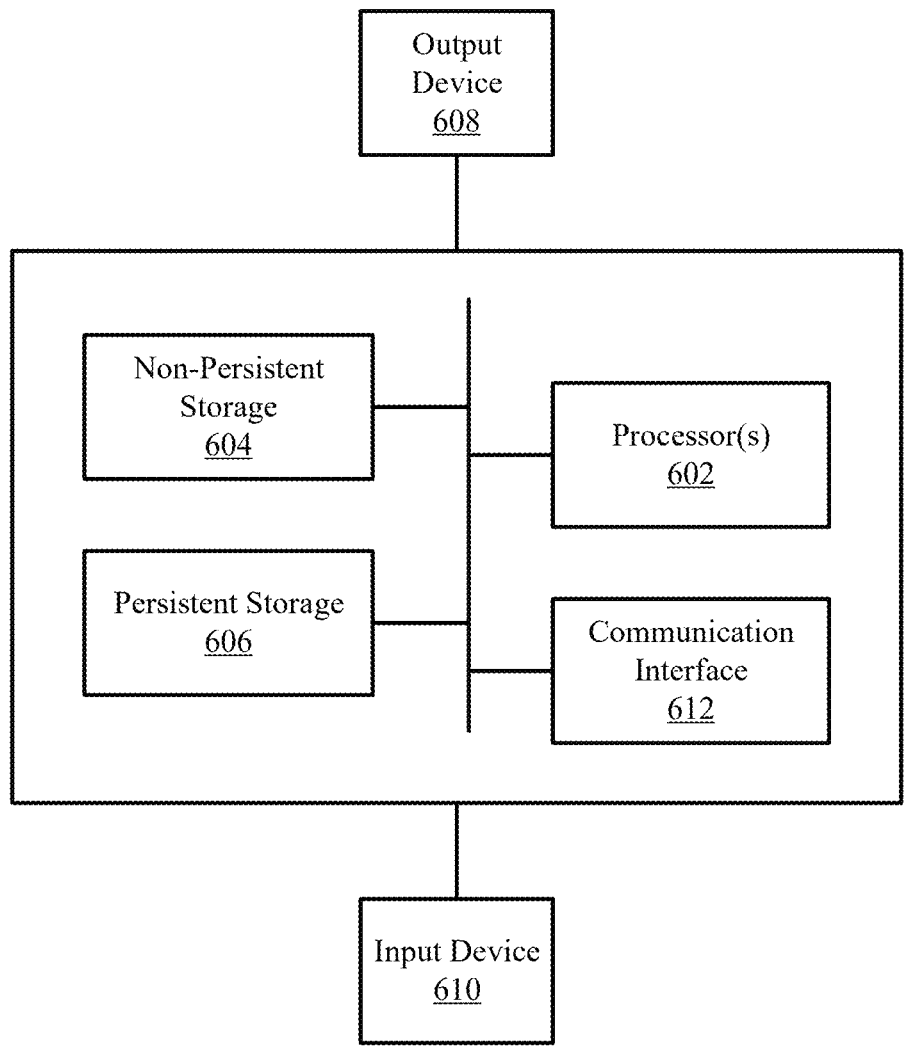
FIG. 6 shows a diagram of a computing device in accordance with one or more embodiments of the invention.

In one or more embodiments, the production environment (130), and/or any components illustrated within, is implemented as one or more computing devices (e.g., 600, FIG. 6). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the production environment (130) (and/or any components illustrated within) described throughout this present disclosure.

Alternatively, in one or more embodiments of the invention, the production environment (130) is implemented as a logical device. A logical device may utilize the computing resources of any number of computing devices to provide the functionality of the production environment (130) described throughout this present disclosure.

In one or more embodiments, the data protection services such as backups or recovery of the virtual machines (132) or AD objects of the AD applications (134) may be orchestrated by a backup server (110). The backup server (110) includes functionality for managing backup schedules for generating the backups (122, 124) for the applications (132, 138) in the production environment (130), managing recovery operations, and monitoring other operations of the production environment (130) for the purposes of data protection.

In one or more embodiments, the backup server (110) may include application discovery services. The application discovery services include identifying VMs (132, 138) operating in the production environment (130) using a registration operation in which all applications (132, 138) in the production environment (130) register their presence with the backup server (110), storing information associated with the VMs (136) such as, for example, the name of the VM, a type of application (e.g., database, virtual machine, a database management system, an AD application (134)) operating in each VM (132, 138), information about the users using the VMs (132, 138), application cluster details, a node selection, and a number of nodes executing the VMs (132, 138). The application discovery performed by the backup server (110) may be performed, for example, in accordance with FIGS. 2.1-2.2, 3.1, 4.1, and 5.1.

In one or more embodiments, the backup server (110) includes an AD recovery microservice (112) and a hypervisor data mover (114). The backup server (110) may include additional, fewer, and/or different components without departing from the invention. In one or more embodiments, the AD recovery microservice (112) includes functionality for providing recovery services of the AD objects from the backups (122, 124) to the production environment (130). Specifically, the AD recovery microservice (112) may parse the VM backups (122) to identify the corresponding AD application backups (124) and use the AD application backups (124) (or the VM backups (122)) to mount the AD objects to the production environment (130), and providing the recovery of the selected AD objects (122, 124) from the backup storage system (120) to the production environment (130).

In one or more embodiments, the hypervisor data mover (1140) includes functionality for moving data to and from the production environment (130). The data may be virtual machine data and/or AD application data such as AD objects. The data may be backed up to the backup storage system (120) using the hypervisor data mover (114). To perform the aforementioned functionality, the backup server (110) uses an index and search microservice (116) to identify objects of the backups (122, 124) and to track whether a VM backup (122) is AD-enabled. Other metadata of the backups (122, 124) may be tracked by the index and search microservice (116) without departing from the invention. The hypervisor data mover (114) may further utilize a backup catalog (118) that tracks backup schedules for generating backups of the virtual machines (136). The backup catalog (118) may be updated based on changes to backup policies and based on activities of the VMs (136) and/or the AD applications (134). The backup catalog may include, for example, identifiers of the VMs, identifiers of corresponding VM backups (122) and AD application backups (124), and whether each VM is AD-enabled (discussed below in FIG. 2.1). The backup catalog (118) may include other information without departing from the invention.

To monitor the activities of the VMs (136), the hypervisor data mover (114) may further include functionality for installing AD listeners (e.g., 142). The AD listener (142) includes functionality for monitoring the AD applications (134) in the VMs (136) and tracking the changes made to the AD objects, changes to the AD applications (134) such as newly installed AD applications, users added or removed, devices added or removed, and/or any other changes without departing from the invention. In one or more embodiments, the backup server (110) includes functionality for managing the number of AD listeners (142) installed in the production environment (130). For example, the number of installed AD listeners (142) may be modified based on the tracked changes of the currently installed AD listeners (142). The management of the AD listeners may be performed, for example, in accordance with FIGS. 4.1-4.2.

In one or more embodiments, the backup server (110) is implemented as one or more computing devices (e.g., 600, FIG. 6). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the backup server (110) (and/or any components illustrated within) described throughout this present disclosure.

Alternatively, in one or more embodiments of the invention, the backup server (110) is implemented as a logical device. A logical device may utilize the computing resources of any number of computing devices to provide the functionality of the backup server (110) described throughout this present disclosure.

FIG. 2.1 shows a flowchart of a method of backing up an AD-enabled virtual machine in accordance with one or more embodiments of the invention. The method shown in FIG. 2.1 may be performed by, for example, a backup server (e.g., 110, FIG. 1). Other components of the system in FIG. 1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 2.1, in step 200, a backup request is obtained for a virtual machine that includes at least one active directory (AD) applications. The backup request may specify backing up the virtual machine and any data generated or otherwise hosted by the virtual machine. The backup request may be generated in response to a backup schedule that specifies a rate for generating the backup.

In step 202, a backup of the VM and the AD application(s) is performed. In one or more embodiments, the backup is performed by using a hypervisor data mover of the backup server to identify the AD application(s) hosted by the VMs, generate a copy of the virtual machine data and the AD objects, and store the copies as a VM backup and an AD application backup, respectively.

In step 204, the stored backup is marked as AD-enabled. In one or more embodiments, the VM is marked as AD-enabled based on the identification of the AD application. The marking of the VM backup as AD-enabled may be tracked using an index and search microservice of the backup server.

FIG. 2.2 shows a flowchart of a method of restoring AD objects from an AD-enabled virtual machine in accordance with one or more embodiments of the invention. The method shown in FIG. 2.2 may be performed by, for example, a backup server (e.g., 110, FIG. 1). Other components of the system in FIG. 1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 2.2, in step 210, a restoration request is obtained for a virtual machine that includes AD applications. The restoration request specifies mounting the AD objects of the AD applications to the production environment to select the AD objects to be restored to the production environment.

In step 212, the VM backup is parsed to identify the AD applications in the VM backup using metadata stored in an index and search microservice. The VM backup is parsed by using a backup catalog to identify whether the VM backup is AD-enabled. The VM backup is further parsed to identify a storage location of the AD application backup. For example, the VM backup may include metadata associated with each application hosted by the backed up VM at the corresponding point in time. Such metadata may specify the storage locations of the backups of any AD applications of the backed up VM.

In step 214, an AD recovery microservice is used to mount the AD objects of the AD application to the production environment. In one or more embodiments, the AD recovery microservice uses the storage location of the AD application backups to locate the backups of the AD objects in the backup storage system. The mounting includes generating references such as pointers and providing the references to the production environment for the browse and restoration services.

In step 216, browse and restoration services are provided to the production environment using the mounted AD objects. In one or more embodiments, the browse and restoration services includes enabling a user of the production environment (e.g., the user initiating the restoration request) to select, from the mounted set of AD objects, a subset of AD objects that are to be restored to the production environment. The AD objects may be restored, specifically, to an AD application executing in the production environment. The AD recovery microservice may, in response to a selection of the subset of AD objects, restore the subset of AD objects to the AD application.

To clarify aspects of the invention described, for example, in FIGS. 2.1-2.3, a first example is illustrated and described in FIG. 2.3.

FIG. 2.3 shows a diagram of a first example in accordance with one or more embodiments of the invention. Any data transfer between components of the diagram of FIG. 2.3 may be illustrated using circled numbers, and described herein using bracketed numbers (e.g., "[1]").

The diagram of FIG. 2.3 includes a production environment (230) that hosts VM A (232). VM A (232) includes an active directory (AD) application (234) and a backup agent (240) used for backing up the virtual machine data and AD objects of the AD application (234). During backup, a copy of the AD objects and the virtual machine data is generated by the backup agent (240) [1]. The backup agent (240) stores the copied data as a VM A backup (222) and an AD application backup (224) in a backup storage system (220) [2].

At a later point in time, a user of VM A (232) initiates a restoration of AD objects of the AD application (234) [3]. Without the use of the backup agent (240), a backup server (250) performs the recovery services. Specifically, an AD recovery microservice (252) of the backup server (250) uses an index and search microservice (256) to identify the relevant metadata associated with the VM A backup (222) and the AD application backup (224) such as storage locations of the AD objects in the AD application backup (224) [5]. The AD recovery microservice (252), after obtaining the relevant metadata, accesses the AD objects in the AD application backup (224) [5]. The AD objects are mounted on the production environment (230). The mounting is used for browse services by a user of VM A (232) and recovery services by the AD backup server (250) in accordance with FIG. 2.2 [6].

FIG. 3.1 shows a flowchart of a method of tracking changes to AD objects in an AD-enabled virtual machine in accordance with one or more embodiments of the invention. The method shown in FIG. 3.1 may be performed by, for example, a backup server (e.g., 110, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 3.1, in step 300, discovery is initiated for a new VM in a production environment. The discover may include obtaining additional information about the new VM such as a type of applications executing on the new VM, a number of users using or operating each of the applications, and a rate that each application is backed up or recovered. The rate of an application being backed up and/or recovered may be referred to as a rate of data protection.

In step 302, listening is performed on subscribed AD applications in the production environment. The listening may include tracking activity of the AD application(s) in the production environment using resilient change tracking (RCT). Changes made to the AD application may include, for example, changes to the users operating the AD applications, changes to devices installed and using the AD applications, data such as AD objects added, deleted and/or modified in the AD applications. An AD listener performing the listening may be installed in the production environment by a backup server in response to the discovery of the new VM.

In step 304, after a threshold is met, the stored changes are aggregated for each AD application in the production environment to obtain a change report. The threshold may be, for example, a time period, a predefined number of changes, and/or any other type of threshold without departing from the invention. The change report may be an aggregation of all changes made since the last time the changes were sent to the backup server.

In step 306, the stored changes are provided to the backup server. The stored changes may be provided as the change report. In one or more embodiments, the stored changes are used for generating incremental backups of the virtual machines hosting the AD applications. The stored changes may be further used for backup schedule modification or AD listener installation (See FIGS. 4.1-4.2).

In one or more embodiments, the incremental backups are generated by identifying an AD application in a VM being backed up, performing a backup of the VM, and using the stored changes associated with the AD application to update the VM backup.

To clarify aspects of the invention described, for example, in FIG. 3.1, a second example is illustrated and described in FIG. 3.2.

FIG. 3.2 shows a diagram of a second example in accordance with one or more embodiments of the invention. Any data transfer between components of the diagram of FIG. 3.2 may be illustrated using circled numbers, and described herein using bracketed numbers (e.g., "[1]").

The diagram of FIG. 3.2 includes a production environment (330) that includes two virtual machines: VM A (334A) and VM B (332B). VM A (332A) hosts AD application A (334A), and VM B (332B) hosts AD application B (334B). In this example, VM B (332B) is a new application installed in the production environment (330). In response to the new VM (334B), an AD listener (342) is installed to listen to changes made to VM B (332B) and AD application B (334B) [1]. The AD listener (342) performs the listening in accordance with FIG. 3.1 to track changes made to AD application B (334B) [2]. The tracked changes are provided to a hypervisor data mover (354) of a backup server (350). An index and search microservice (356) of the hypervisor data mover (354) may store metadata associated with the tracked changes. The tracked changes are used to perform an incremental backup of VM B (332B) and store the incremental backup in the VM backups (322) and AD application backups (324) of a backup storage system (320) [4].

FIG. 4.1 shows a flowchart of a method of modifying backup schedules and AD listeners in accordance with one or more embodiments of the invention. The method shown in FIG. 4.1 may be performed by, for example, a backup server (e.g., 110, FIG. 1). Other components of the system in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 4.1, in step 400, changes associated with AD applications in a production environment are obtained. In one or more embodiments, the obtained changes include the change report discussed in FIG. 3.1.

In step 402, a policy modification is performed on the AD listeners installed in the production environment based on the obtained changes. In one or more embodiments, the policy modification includes increasing or decreasing a number of installed AD listeners in a production environment. The number of installed AD listeners may be determined by analyzing the stored changes and determining a pre-defined number proportionate to a tracked change rate of AD objects specified in the change report. For example, for a high change rate, a proportionately higher number of AD listeners may be installed. Conversely, for a low change rate, a number of AD listeners may be uninstalled.

In step 404, a backup schedule modification is applied on the production environment based on the obtained changes.

In one or more embodiments, the backup schedule modification may include increasing or decreasing a rate of backup generation of a corresponding VM(s) in the change report. The increasing or decreasing of the rate of backup generation may be determined by performing a backup schedule analysis on the change report to determine an output value that relates to a backup schedule. For example, for a high change rate, a proportionately higher frequency may be specified for backing up a corresponding VM backup. Conversely, for a low change rate, a low frequency may be specified.

To clarify aspects of the invention described, for example, in FIG. 4.1, a third example is illustrated and described in FIG. 4.2.

FIG. 4.2 shows a diagram of a third example in accordance with one or more embodiments of the invention. The diagram of FIG. 4.2 shows an example system that includes two production environments (430A, 430B), a backup server (450) hosting an AD recovery microservice (452) and a hypervisor data mover (454), and a backup storage system (420) that hosts VM backups (422) and AD application backups (424). Each production environment (430A) hosts a VM (432A, 432B). VM A (432A) includes AD application A (434A), and VM B (432B) includes AD application B (434B).

The backup server (450) performs the method of FIG. 4.1 to determine a number of AD listeners (440A, 440B) to be installed in the production environments (430A, 430B). Based on historic changes tracked for AD application A (434A), production environment A (430A) is determined to require one AD listener (440A). Similarly, based on historic changes tracked for AD application B (434B), production environment B (430B) is determined to require one AD listener (440B).

The backup server (450) further performs backup schedule modifications for each VM (432A, 434B) based on the tracked changes for the corresponding AD applications (434A, 434B). The rate of data protections is stored in a backup catalog (458) of the hypervisor data mover (454).

FIG. 5.1 shows a flowchart of a method of recovering AD objects in accordance with one or more embodiments of the invention. The method shown in FIG. 5.1 may be performed by, for example, a backup server (e.g., 110, FIG. 1). Other components of the system in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner with other steps in other methods without departing from the invention.

Turning to FIG. 5.1, in step 500, a request for restoring AD objects of an AD application is obtained. The request may be obtained based on the browse and restoration services provided by the backup server (e.g., using the AD recovery microservice) in accordance with FIG. 2.2.

In step 502, an unprocessed AD object is selected. The unprocessed AD object may be one of the set of AD objects to be restored specified in the request.

In step 504, a generation identifier (ID) is obtained for the selected AD object. The generation ID may be obtained from a backup catalog. The generation ID may be a value that uniquely identifies an AD object at a timestamp. Each version of an AD object modified at different points in time may be uniquely identified using a corresponding generation ID.

In step 506, a determination is made about whether the obtained generation ID indicates that the selected AD object is recoverable from a production tombstone. The generation ID may indicate that the AD object is recoverable if the backup catalog specifies the generation ID for being included in the production tombstone. If the selected AD object is recoverable from the production tombstone, the method proceeds to step 508; otherwise, the method proceeds to step 510.

In step 508, following the determination that the generation ID indicates that the AD object is recoverable from the production tombstone, the AD object is recovered from the production tombstone. In one or more embodiments, an AD recovery microservice may be used to perform the recovery.

In step 510, following the determination that the selected AD object is not recoverable from the production tombstone, another determination is made about whether the generation ID indicates the AD object is recoverable from a corresponding VM backup tombstone. If the AD object is recoverable from the VM backup tombstone, the method proceeds to step 512; otherwise, the method proceeds to step 514.

In step 512, following the determination that the AD object is recoverable from the VM backup tombstone, the selected AD object is recovered from the VM backup tombstone. In one or more embodiments, an AD recovery microservice may be used to perform the recovery.

In step 514, following the determination that the selected AD object is not recoverable from the VM backup, the selected AD object is recovered from the AD application backup tombstone. In one or more embodiments, an AD recovery microservice may be used to perform the recovery.

In step 516, a determination is made about whether all AD objects in the request have been processed. If all AD objects have been processed, the method ends following step 516; otherwise, the method proceeds to step 502.

To clarify aspects of the method described in FIG. 5.1, a fourth example is illustrated in FIG. 5.2.

FIG. 5.2 shows a diagram of a fourth example in accordance with one or more embodiments of the invention. The diagram of FIG. 5.2 shows an example system that includes a production environment (530), a backup server (550) hosting an AD recovery microservice (552) and a hypervisor data mover (554), and a backup storage system (520) that hosts VM backups (522) and AD application backups (524). The production environment (530) hosts a VM (532). VM A (532) includes AD application A (534). The production environment (530) further hosts a production tombstone (540) that stores AD objects (542) that have been deleted from the AD application (534). Each of the deleted AD objects (542) is identified using a generation identifier (ID) (not shown in FIG. 5.2) that uniquely identifies an AD object at a given timestamp. The generation IDs may be stored in the backup server (550) and used for AD object recovery to the VM (532). As the deleted AD objects (542) age, the deleted AD objects (542) may be deleted from the production tombstone (540), yet preserved in a backup tombstone (526) of the VM A backups (522) and/or in an AD tombstone (528) of the AD application backups (524). Based on the method of FIG. 5.1, the backup server (550) determines a storage location of a set of AD objects selected to be recovered. The selection of AD objects to be recovered may be performed using an AD recovery microservice (552) that mounts the backed up AD objects on the production environment (530).

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for securely and automatically managing the execution of data protection services between a backup server and one or more production environments across a network. Specifically, embodiments of the invention provide restoration services at an application-level for active directory applications. Such granular restoration services may be performed without requiring an agent to be installed in the production environment(s).

Further, embodiments disclosed herein enable the backup server to install listeners specialized in tracking changes to an AD application running in a virtual machine. The tracked changes may be used for incremental backups of the virtual machine. Such embodiments may provide granular level data protection of the virtual machines by tracking changes to the AD application within the virtual machine backup. The granular level data protection may further provide restoration services to AD objects of the AD application using the virtual machine backup in addition to using a separate AD application backup.

One or more embodiments of the invention reduce the resource consumption of AD application data protection by managing a number of AD listeners installed in the production environments executing the AD applications. The tracked changes may be used to manage the number by, for example, reducing the number of AD listeners if a rate of change is within a pre-defined range (e.g., below a threshold). The reduced use of resources may improve computing resource performance in the production environment.

Embodiments of the invention further reduce the resource consumption from AD application data protection by using a production tombstone, a virtual machine backup tombstone, or an AD application backup tombstone. Each of the aforementioned tombstones may vary in distance across a network to the destination location (i.e., the production environment) of the restored AD objects. For example, the production tombstone may be more proximate to the production environment and thus utilize less network resources when used to restore AD objects relative to using a VM backup stored in a separate backup storage system. Embodiments disclosed herein implement methods for selecting the most effective tombstone for restoring AD objects based on network proximity.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing data protection, the method comprising:
　　obtaining, by a backup server, a restoration request for restoring a subset of active directory (AD) objects to a production environment, wherein the production environment hosts a virtual machine (VM) executing an AD application, wherein the AD application comprises the subset of AD objects and a directory service for managing the subset of AD objects;
　　in response to the restoration request:
　　　　obtaining a generation identifier (ID) for a first AD object of the subset of AD objects;
　　　　making a first determination, using the generation ID, that the first AD object is not recoverable using a production tombstone of the production environment;
　　　　in response to the first determination, making a second determination that the first AD object is not recoverable using a VM backup tombstone, wherein the VM backup tombstone is stored in a VM backup in a backup storage system;
　　　　in response to the second determination, recovering the first AD object using an AD application backup tombstone, wherein the AD application backup tombstone is stored in an AD application backup in the backup storage system;
　　　　making a third determination, using a second generation ID of a second AD object of the subset of AD objects, that the second AD object is recoverable using the production tombstone; and based on the third determination, recovering the second AD object from the production tombstone.

2. The method of claim 1, further comprising:

making a fourth determination, using a third generation ID of a third AD object, that the third AD object is not recoverable from the production tombstone;

in response to the fourth determination, making a fifth determination that the third AD object is recoverable using the VM backup tombstone; and based on the fifth determination, recovering the third AD object using the VM backup tombstone.

3. The method of claim 1, wherein the first AD object is an earlier version of the second AD object.

4. The method of claim 1, wherein a portion of AD objects deleted from the AD application are stored in the production tombstone, wherein the portion of AD objects are deleted from the production tombstone after a first point in time and stored in the VM backup tombstone, and wherein the portion of AD objects are deleted from the VM backup tombstone after a second point in time and stored in the AD application tombstone.

5. The method of claim 1, wherein the VM backup tombstone is stored separately from the AD application backup tombstone, and wherein the AD application backup comprises a backup of one AD object in the subset of AD objects.

6. The method of claim 1, wherein a plurality of generation IDs for the production tombstone is stored in a backup catalog of the backup server, and wherein the plurality of generation IDs comprises the second generation ID.

7. The method of claim 6, wherein a second plurality of generation IDs for the AD application backup tombstone is stored in the backup catalog, and wherein the second plurality of generation IDs comprises the first generation ID.

8. The method of claim 1, wherein the production environment comprises a plurality of VMs each hosting at least one of a plurality of AD applications, wherein the VM is one of the plurality of VMs.

9. A non-transitory computer readable medium comprising computer readable program code, which when executed by a computer processor enables the computer processor to perform a method for managing data protection, the method comprising:

obtaining, by a backup server, a restoration request for restoring a subset of active directory (AD) objects to a production environment, wherein the production environment hosts a virtual machine (VM) executing an AD application, wherein the AD application comprises the subset of AD objects and a directory service for managing the subset of AD objects;

in response to the restoration request:

obtaining a generation identifier (ID) for a first AD object of the subset of AD objects;

making a first determination, using the generation ID, that the first AD object is not recoverable using a production tombstone of the production environment;

in response to the first determination, making a second determination that the first AD object is not recoverable using a VM backup tombstone, wherein the VM backup tombstone is stored in a VM backup in a backup storage system;

in response to the second determination, recovering the first AD object using an AD application backup tombstone, wherein the AD application backup tombstone is stored in an AD application backup in the backup storage system;

making a third determination, using a second generation ID of a second AD object of the subset of AD objects, that the second AD object is recoverable using the production tombstone; and based on the third determination, recovering the second AD object from the production tombstone.

10. The non-transitory computer readable medium of claim 9, further comprising:

making a fourth determination, using a third generation ID of a third AD object, that the third AD object is not recoverable from the production tombstone;

in response to the fourth determination, making a fifth determination that the third AD object is recoverable using the VM backup tombstone; and based on the fifth determination, recovering the third AD object using the VM backup tombstone.

11. The non-transitory computer readable medium of claim 9, wherein the first AD object is an earlier version of the second AD object.

12. The non-transitory computer readable medium of claim 9, wherein a portion of AD objects deleted from the AD application are stored in the production tombstone, wherein the portion of AD objects are deleted from the production tombstone after a first point in time and stored in the VM backup tombstone, and wherein the portion of AD objects are deleted from the VM backup tombstone after a second point in time and stored in the AD application tombstone.

13. The non-transitory computer readable medium of claim 9, wherein the VM backup tombstone is stored separately from the AD application backup tombstone, and wherein the AD application backup comprises a backup of one AD object in the subset of AD objects.

14. The non-transitory computer readable medium of claim 9, wherein a plurality of generation IDs for the production tombstone is stored in a backup catalog of the backup server, and wherein the plurality of generation IDs comprises the second generation ID.

15. The non-transitory computer readable medium of claim 14, wherein a second plurality of generation IDs for the AD application backup tombstone is stored in the backup catalog, and wherein the second plurality of generation IDs comprises the first generation ID.

16. The non-transitory computer readable medium of claim 9, wherein the production environment comprises a plurality of VMs each hosting at least one of a plurality of AD applications, wherein the VM is one of the plurality of VMs.

17. A system, comprising:

a processor; and memory including instructions, which when executed by the processor, perform a method comprising:

obtaining, by a backup server, a restoration request for restoring a subset of active directory (AD) objects to a production environment, wherein the production environment hosts a virtual machine (VM) executing an AD application, wherein the AD application comprises the subset of AD objects and a directory service for managing the subset of AD objects;

in response to the restoration request:

obtaining a generation identifier (ID) for a first AD object of the subset of AD objects;

making a first determination, using the generation ID, that the first AD object is not recoverable using a production tombstone of the production environment;

in response to the first determination, making a second determination that the first AD object is not recoverable using a VM backup tombstone, wherein the VM backup tombstone is stored in a VM backup in a backup storage system;

in response to the second determination, recovering the first AD object using an AD application backup tombstone, wherein the AD application backup tombstone is stored in an AD application backup in the backup storage system;

making a third determination, using a second generation ID of a second AD object of the subset of AD objects, that the second AD object is recoverable using the production tombstone, wherein the first AD object is an earlier version of the second AD object;

based on the third determination, recovering the second AD object from the production tombstone;

making a fourth determination, using a third generation ID of a third AD object, that the third AD object is not recoverable from the production tombstone;

in response to the fourth determination, making a fifth determination that the third AD object is recoverable using the VM backup tombstone; and based on the fifth determination, recovering the third AD object using the VM backup tombstone.

18. The method of claim 1, wherein a portion of AD objects deleted from the AD application are stored in the production tombstone, wherein the portion of AD objects are deleted from the production tombstone after a first point in time and stored in the VM backup tombstone, and wherein the portion of AD objects are deleted from the VM backup tombstone after a second point in time and stored in the AD application tombstone.

19. The system of claim 17, wherein the VM backup tombstone is stored separately from the AD application backup tombstone, and wherein the AD application backup comprises a backup of one AD object in the subset of AD objects.

20. The system of claim 17, wherein the production environment comprises a plurality of VMs each hosting at least one of a plurality of AD applications, wherein the VM is one of the plurality of VMs.

* * * * *